United States Patent [19]

Rozenblit

[11] Patent Number: 4,763,319
[45] Date of Patent: Aug. 9, 1988

[54] MULTI-RATE SYNCHRONOUS VIRTUAL CIRCUIT NETWORK FOR VOICE AND DATA COMMUNICATIONS

[75] Inventor: Moshe Rozenblit, Chatham, N.J.

[73] Assignee: Bell Communications Research, Inc., Livingston, N.J.

[21] Appl. No.: 864,782

[22] Filed: May 19, 1986

[51] Int. Cl.⁴ .................................................. H04J 3/16
[52] U.S. Cl. .......................................... 370/84; 370/89
[58] Field of Search .................... 370/79, 83, 84, 89, 370/95, 60, 94

[56] References Cited

U.S. PATENT DOCUMENTS

| Re. 31,319 | 7/1983 | Fraser . | |
|---|---|---|---|
| 3,749,845 | 7/1973 | Fraser | 179/15 AL |
| 4,068,098 | 1/1978 | Thyselius | 370/84 |
| 4,161,629 | 7/1979 | Kits Van Heyningen | 370/84 |
| 4,218,756 | 8/1980 | Fraser | 364/900 |
| 4,291,200 | 9/1981 | Smith | 179/18 BD |
| 4,387,458 | 6/1983 | Carbrey | 370/88 |
| 4,429,383 | 1/1984 | Finck et al. | 370/84 |
| 4,577,312 | 3/1986 | Nash | 370/84 |
| 4,704,716 | 11/1987 | Bowers et al. | 370/84 |

FOREIGN PATENT DOCUMENTS 0204342  11/1984  Japan .................................... 370/89

OTHER PUBLICATIONS

Amstutz "Burst Switching—A Method for Dispersed and Integrated Voice and Data Switching", ICC Conference Record vol. 1, Jun. 19, 1983, pp. 288–292.

Haselton "A PCM Frame Switching Concept Leading to a Burst Switching Network Architecture" ICC Conference Record vol. 3, Jun. 22, 1983, pp. 1401–1406.

Turner, J. S. "A Packet Network Architecture for Integrated Services", IEEE Globecom Conference Record, 1983.

Primary Examiner—Douglas W. Olms
Assistant Examiner—Melvin Marcelo
Attorney, Agent, or Firm—James W. Falk

[57] ABSTRACT

A transmission network for enabling communication between a multiplicity of user stations is disclosed. The network can handle a wide variety of traffic types ranging from the continuous transmission of batch data to the bursty transmission of voice and interactive data. The network comprises an array of switches which are connected by trunk groups. Communication between any pair of user stations is achieved by means of a virtual circuit which passes through one or more of the switches. Frames of data are synchronously transmitted between the switches. Variable bit rate capability is achieved by allocating different numbers of slots in each frame to different virtual circuits.

7 Claims, 7 Drawing Sheets

VC: VIRTUAL CIRCUIT
F: END OF SPURT FLAG
H: HEADER
SLOTS NEEDED PER VC:
  VC# : 3 2 9 6 1 5
  # SLOTS : 5 5 2 1 2 3

MULTI-RATE SYNCHRONOUS VIRTUAL CIRCUIT NETWORK FOR VOICE AND DATA COMMUNICATIONS

FIELD OF THE INVENTION

This invention relates to a telecommunications network which can handle multiple bit rate data transmissions.

BACKGROUND OF THE INVENTION

To support applications where communication among varied users is required, circuit switching or packet switching techniques are generally utilized.

Circuit switching typically results in the establishment of switched point-to-point channels, i.e. the network switching system sets up a single circuit so that there is a direct connection between the source and destination of the information to be transmitted. Circuit switching is generally used for for voice and batch oriented applications which involve the continuous transmission of data in a synchronous manner. However, circuit switching is inefficient for bursty traffic such as real time interactive data communications and in addition is limited in the bit rates of continuous traffic that can be supported.

Packet switching is based on the virtual circuit concept. A packet switching network typically comprises an array of packet switches which are connected by very high capacity (e.g. 1.5 megabits per second) links. At call set-up time, customer A dials the number of customer B. The best route through the network from A to B is then determined for the duration of the call. For example, the call may leave station A on line a, be routed through packet switches X,Y,Z which switches are connected by the high capacity links and enter station B on line b. When a talk or data spurt from station A (typically at 64 kilo bits/sec.) is detected at the switch X, it is broken down into several packets depending upon the length of the data spurt. Each packet is headed by a header including a virtual circuit number and terminated by a flag. As soon as a packet has been assembled at switch X, it can leave on the link to switch Y. If the link is busy, the packet may be stored in a buffer until the link is available. The size of the buffer is of course finite and a packet that has been waiting too long may be discarded.

In general, a given link such as the link connecting packet switches X and Y is used for multiple concurrent transmissions, as the given link may form part of any number of virtual circuits. It is the role of a protocol handler in each packet switch to multiplex packets having a variety of virtual circuit numbers into a single stream of data to be transmitted over the given link and to demultiplex received packets into independent streams of data.

Packet switching is well suited for bursty data such as real time interactive data communications but is very inefficient for continuous communications such as the batch transfer of data. The reason for this is that each packet has a significant number of bits devoted to the header and the flag. Thus, there is a significant "overhead" when packet switching is used to transmit continuous traffic. Another problem with packet switching is increased system delay due to the fact that the first switch must wait to receive enough bits to form a packet before any bits are transmitted to the next switch.

Note that packet switching may be used to transmit different types of traffic at different bit rates. Different bit rates may be achieved by varying the size of the packet or by varying the number of packets attributable to a particular virtual circuit in a particular time interval.

This multiple bit rate capability generally proves useful when the network is congested. For example, it may be useful to reduce the effective bit rate of certain talk spurts from 64k bits/sec. to 32k bits/sec. This can be accomplished in packet switching by decreasing the size of each packet allocated to the talk spurt or by reducing the rate at which packets attributable to the talk spurt are transmitted. Both of these techniques have drawbacks. Decreasing the size of each packet causes an increase of "overhead" i.e. the fraction of bits occupied by header and flag information increase. Reducing the rate at which packets attributable to a given talk spurt are transmitted causes increased system delay.

Another type of switching technique which can be used to support communications among multiple user stations is exemplified by the Distributed Burst Switching System (DBSS) developed by GTE Laboratories. (See for example S. R. Amstutz: "Burst Switching—A Method for Distributed and Integrated Voice and Data Switching" ICC Conference Record Vol. 1 pp. 288–292 June 19, 1983; E. F. Haselton "A PCM Frame Switching Concept Leading to Burst Switched Network Architecture" ICC 1983 Conference Record Vol. 3 pp. 1401–1406 June 22, 1983). Burst switching utilizes concepts which are common to both circuit switching and packet switching.

Like the aforedescribed packet switching technology, the Distributed Burst Switching System utilizes the virtual circuit concept. The Distributed Burst Switching System comprises an array of Burst Switches, which switches are described in the aforementioned references.

The establishment of the virtual circuit in burst switching may be similar to the establishment of the virtual circuit in the packet switching technology. At call set-up time a customer at station A dials the number of station B. The best route from station A to station B is determined for the duration of the call. For example, the call may originate at station A on line a, be routed through burst switches X,Y,Z and enter station B on line b.

The aforementioned DBSS is a synchronous system which successively transmits 125 microsecond frames between adjacent burst switches. Each frame has 24 eight bit slots, and one additional bit for frame synchronization. One slot in each frame transmitted between two adjacent burst switches is allocated to a particular virtual circuit as long as that particular virtual circuit is being used to transmit a voice or data spurt. When the particular virtual circuit is not being used to transmit a voice or data spurt, the slot may be allocated to another virtual circuit.

The DBSS is able to handle continuous traffic like circuit switching and bursty traffic like packet switching. The continuous traffic is handled merely by keeping a particular virtual circuit active over an extended period of time. The "overhead" is relatively low as only one header is needed to transmit an entire stream of continuously transmitted data. In contrast packet switching would transmit the same batch of data by dividing it into a plurality of packets, each packet being accompanied by a header and a flag. Thus, the "overhead" is significantly higher when packet switching technology is used to transmit batch data.

Bursty traffic is also efficiently transmitted by DBSS. After a burst of data has been transmitted over a particular virtual circuit, the slot allocated to that particular virtual circuit is then allocated to another virtual circuit to make maximum use of available resources. No slot is allocated to virtual circuits which are silent by virtue of their being between bursts.

However, the DBSS cannot easily handle transmissions at a variety of bit rates. This is manifest from the operation of the DBSS system itself. Because only one 8 bit slot in a 125 μsec. frame is allocated to a particular virtual circuit, each virtual circuit in DBSS, whether used for continuous data or a bursty data, has an effective bit rate of 64 kilobits. No provision is made to increase this rate to handle types of traffic such as video which may require a higher rate and no provision is made to decrease this rate if for example there is network congestion.

It is an object of the present invention to provide a transmission network which, like DBSS, can efficiently handly a variety of data types ranging from bursty interactive type transmissions to continuous batch data transfers. Such data types may include voice, video, real time interactive data (i.e. inquiry and response), as well as non-real time batch data transfer. Since such a variety of traffic types involves a variety of bit transmission rates, it is an objective of the present invention to provide a transmission network which can efficiently handle such a variety of bit transmission rates. The ability to handle multiple bit rate transmissions is also important to provide network controllers with the flexibility to handle network problems such as congestion by varying the transmission rate of particular transmissions.

SUMMARY OF THE INVENTION

The network of the present invention is a synchronous virtual circuit network which is adapted to support multiple bit rate transmissions. This network offers the efficiency of circuit switching for continuous communications and the versatility of packet switching for bursy traffic such as real time interactive data communications. The network of the present invention overcomes the primary shortcoming of the above-described DBSS network in that it can handle multiple bit rate transmissions.

The network of the present invention comprises an array of synchronous virtual circuit switching nodes which are connected by trunk groups. Numerous virtual circuits may exist simultaneously within the network to support communications between multiple user stations.

Frames of data are synchronously transmitted between adjacent synchronous virtual circuit switching nodes in the network. Typically (but not necessarily) each frame has a duration of 125 μsec. and includes 193 bits. One bit is used for frame synchronization leaving 192 bits which are typically divided into 24 eight bit slots. The time slots in each frame transmitted between a particular pair of switching nodes are allocated among the group of virtual circuits which utilize the particular pair of switching nodes. The allocation mechanism is such that different virtual circuits can have different numbers of slots in each frame, and thereby transmit information at different bit rates. For example a virtual circuit with two slots per frame may operate at 128k bit/sec. while a virtual circuit with four slots per frame may operate at 256k bit/sec. This multiple bit rate capability enables different virtual circuits to handle different types of traffic ranging from bursty interactive data transmission to continuous batch data transmissions. In order to accomplish the slot allocation, frame map structures are provided so that both the transmitting switch node and the receiving switch node are able to keep track of which slots in each frame are being used by which virtual circuits and which slots are free.

Transmission of a spurt of data between two users may be understood as follows. Assume there is a virtual circuit connecting a user at station A with a user at station B and that the virtual circuit goes through switches X,Y . . . Assume also that a spurt of data is received by the switch X from the station A. Before any time slots can be allocated by the switch X to the virtual circuit connecting A and B to transmit the data spurt, a header must be placed in front of the spurt and transmitted first. The header includes information indicating the identity of the virtual circuit to which the spurt belongs, the type of transmission, e.g., voice, video etc. as well as bit rate information and error detection information. Typically, the header occupies n(n>1) slots. Illustratively, the header is 32 bits long and equals four slots.

Thus, the first four free slots in the first occurring frame transmitted between switch X and switch Y will be used by the switch X to transmit the header. If there are not four free slots in the first occurring frame, free slots in subsequent frames will be used to complete transmission of the header. It is not necessary for the four header slots to be adjacent to one another. If a header or a portion of a header for a particular spurt is transmitted in a given frame, no user bits from the same spurt will be transmitted in the same frame. User bits will begin transmission in the frame following the one which carried the last bit of the corresponding header.

After the header has been transmitted by switch X to Switch Y, all the time slots it occupied become free. However, both the transmitting switch X and the receiving switch Y use the bit rate information contained in the header to determine the number of slots per frame needed to transmit the data spurt itself. The slot allocation for the data spurt is similar to the slot allocation for the header. The earliest free slot in the next occurring frame will be allocated to the spurt followed by as many consecutive (but not necessarily adjacent) free slots in that frame as are needed. If two or more headers (for two or more different virtual circuits) have been transmitted in one frame by the switch X, then the switch X will start the transmission of two or more spurts in the next frame.

At the conclusion of a data spurt an end of spurt flag will be transmitted. When a switching node receives an end of spurt flag it transmits the flag downstream except that the flag is not transmitted to the end user.

In order to allocate the slots in the above described fashion both the transmitting and receiving switches maintain a frame map which shows the status of each slot. The transmitting switch will use the map of the previous frame to allocate slots in the current frame. The receiving switch will use the map of the previous frame to correctly interpret the slot allocation of the current frame.

Since different virtual circuits may be allocated a different number of slots per frame by a particular transmitting switch, variable bit rate capability is an inherent part of the system. Besides being able to handle a multiplicity of different bit rates, bit rates may also be changed from link to link along a particular virtual circuit. This is achieved by changing the number of slots allocated to a particular virtual circuit at some point along its path. This is particularly useful when network congestion requires the bit rate of a particular transmission to be decreased. Thus, a transmission network is achieved which can handle a wide variety of traffic types with a high level of flexibility. In addition, the overhead with this scheme is fairly small typically (32 bit for the header and 32 bit for the flag) regardless of the duration of the spurt or the bit rate (number of slots per frame) used.

DETAILED DESCRIPTION

1. Virtual Circuit

The present invention is a synchronous virtual circuit communications network which is capable of handling multiple bit rate transmissions between a wide variety of users. The network comprises an array of synchronous virtual circuit switches which are connected by trunk groups. Typically each of the trunk groups has a capacity of 1.5444 megabits/sec.

Figure 1:
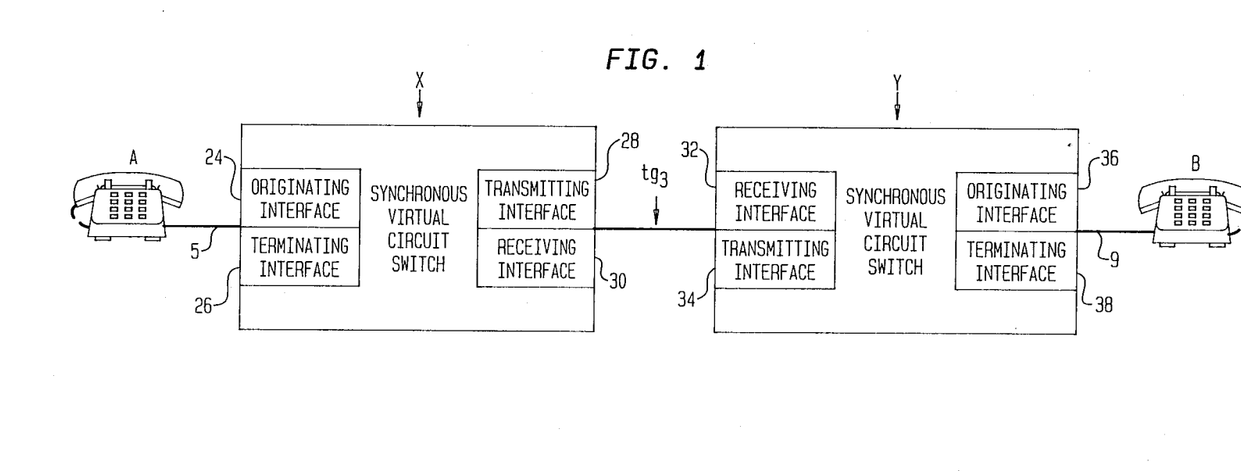
FIG. 1 illustrates a virtual circuit connecting a pair of users in accordance with an illustrative embodiment of the invention.

Turning to FIG. 1, a virtual circuit connecting a first user A with a second user B is shown. The virtual circuit between users A and B is routed through synchronous virtual circuit switches X and Y. The virtual circuit between A and B is established as follows. At call set-up time, customer A dials the number of customer B. The best route from A to B through the network is determined for the duration of the call by conventional methods. In the virtual circuit of FIG. 1, data is routed from user A along subscriber line 5 to switch X, from switch X along trunk group 3 to switch Y, and from switch Y to user B along subscriber line 9. Besides participating in the virtual circuit connecting user A to user B, trunk group 3 linking switches X and Y simultaneously participates in a number of other virtual circuits.

Subscriber line 5 is connected to switch X by means of originating line interface 24 which handles data going into switch X from line 5 and terminating line interface 26 which handles data coming out of switch X over line 5. Trunk group 3 interfaces with switch X by means of transmitting interface 28 which handles data transmitted from switch X over trunk group 3 and receiving interface 30 which handles data received by switch X over trunk group 3. Trunk group 3 is also connected to switch Y by way of receiving and transmitting interfaces 32,34. Similarly, subscriber line 9 is connected to switch node Y by originating and terminating line interfaces 36,38. These interfaces are discussed in detail below.

Switch X stores information which indicates that data arriving from user A along line 5 is to be directed to trunk group 3 with a virtual circuit (VC) identifying number m that remains fixed for the duration of the call. Switch Y has a VC number translation table which serves to translate the incoming VC identifying number m, to a number which identifies the outgoing user line 9. In a virtual circuit which passes through a multiplicity of switches, each switch includes a translation table which translates an incoming virtual circuit number into an outgoing virtual circuit number. Thus, the virtual circuit number may change from switch to switch along the path of a virtual circuit. This provides greater flexibility in the assigning of virtual circuit numbers.

2. Frame Structure

Figure 2:
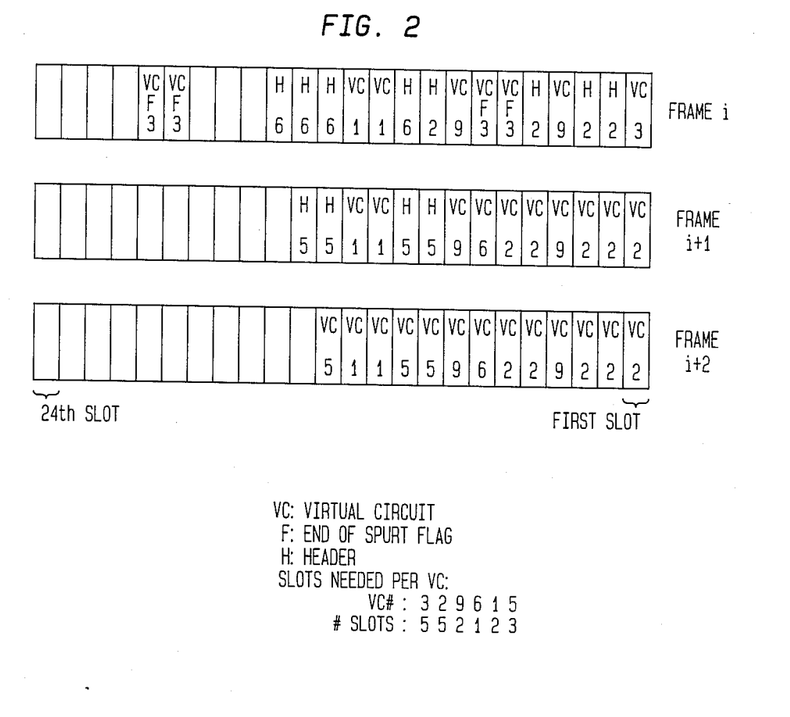
FIG. 2 illustrates the frames of data which are exchanged between the switching nodes comprising the virtual circuit of FIG. 1.

Data is transmitted between pairs of switches, such as X,Y in a synchronous fashion. Typically the data is transmitted between switches in frames lasting 125 microseconds. Each 125 microsecond frame comprises 193 bits, the frame being divided into 24 eight bit slots, with one bit remaining for frame synchronization. FIG. 2 shows three frames which may be transmitted between a pair of switches in the network (e.g. switches X and Y of FIG. 1). Each frame has 24 slots. In each frame, different number of slots are allocated to different virtual circuits. For each frame which is transmitted between a transmitting switch and a receiving switch, both the transmitting switch and the receiving switch know which slots are allocated to which virtual circuits and which slots are free.

Before the switch X can allocate any slots to the virtual circuit connecting user A to user B, so as to transmit a data spurt originating with user A to user B, the switch X first transmits a header which illustratively occupies 32 bits. The header includes a virtual circuit identifying number, bit rate information, and error detection and correction codes. The virtual circuit number is essentially routing information. For example, the switch Y knows that a data spurt which arrives on trunk group 3 from switch X with a particular virtual circuit number is to be routed to user B over line 9. Following completion of a spurt, a 32 bit end of spurt flag is appended thereto.

The switches X and Y allocate the slots in a particular frame to particular virtual circuits according to the following rules.

1. A header will use as many slots as are free in the frame, up to 32 bits (4 slots). It will use the first free slot in the frame and, if necessary, the following free slots. If the free slots in the frame do not add up to 32 bits, then the header may be transmitted over two or more consecutive frames; always using all the free slots until all 32 bits have been transmitted. If more than 32 bits are available in free slots then two or more headers may be transmitted in the same frame. In such a case all the transmitted headers in a frame, except perhaps the last one, will occupy 32 bits in the frame.

2. If a header, or a portion of a header is transmitted in a given frame, no user bits from the same spurt will be transmitted in the same frame. User bits will begin transmission on the frame following the one which carried the last bit of the corresponding header.

3. After a header has been transmitted, all the time slots it occupied become free. However, both the transmitting switch and the receiving switch use the network bit rate information in the header to determine the number of slots per frame required to transmit the spurt itself. The transmitting switch node verifies that enough such slots are available before sending the header. The slot allocation for the spurt will be similar to the slot allocation for the header. The earliest free slot will be allocated, followed by as many consecutive (but not necessarily adjacent) free slots as needed. If two or more headers have been transmitted in one frame, then two or more spurts will start transmission on the next frame. The order of slot allocation for the spurts will be the same as the order of slot allocation for their respective headers.

4. Whenever an end-of-spurt flag is transmitted, all the slots allocated to the corresponding virtual circuit become free.

5. Unused free slots will be filled with suitable synchronization characters.

In order to implement this protocol both sides of the transmission link will have to maintain a frame map which shows the status of each slot. The transmitter will use the map of the previous frame to allocate slots in the current frame and update the map. The receiver will use the map of the previous frame to correctly interpret the slot allocation of the current frame and update the frame map to enable interpretation of the next frame.

Since different virtual circuits are allocated different numbers of slots per frame, the network has a variable bit rate capability. In the case of 24, eight bit slots per 125 microsecond frame, the bit rate can vary in steps of 64 kilobits/sec.

FIG. 2 shows three successive 24 slot frames which illustratively may be transmitted between the switches X,Y. The slots in their frames are allocated in accordance with the above stated rules. The slots may be occupied by user bits which are designated VC (virtual circuit), end of spurt flag bits which are given the designation F, and header bits which are given the designation H. In FIG. 2, each of the frames i,i+i,i+2 also includes a number of free slots which contain synchronization characters.

Virtual circuit 3 is allocated 5 slots in frame i. One slot contains user bits, and 4 slots contain an end of spurt flag which indicates that all of the slots allocated to virtual circuit 3 in frame i will be free in frame i+1. Frame i also contains four slots which transmit the header for a spurt in virtual circuit 2. These slots also become free in the next frame as transmission of this header is complete. Frame i also contains 4 slots which are allocated to a header for a spurt in virtual circuit 6, which slots also become free in frame i+1. Virtual circuit 9 has two slots allocated to it for user bits in frame i and virtual circuit 1 has also two slots for user bits in frame i. Thus it is clear that the multiple bit rate capability of the present invention depends on the number of slots per frame allocated to particular virtual circuits.

In frame i+1, the first 5 free slots are allocated to virtual circuit 2, while the next free slot is allocated to virtual circuit 6. (Note, that headers for virtual circuits 2 and 6 were transmitted in frame i). Thus, for the transmission of user bits, virtual circuit 2 is allocated 5 slots per frame and virtual circuit 6 is allocated 1 slot per frame. The bit rate of virtual circuit 2 is five times the bit rate of virtual circuit 6. (e.g. 380 kilobit/sec. versus 64 kilo bits/sec.) The next four free slots in frame i+1 are allocated to a header for virtual circuit 5. These four slots become free in the next frame i+2. In frame i+1 virtual circuits 9 and 1 are allocated the same slots as they are allocated in frame i. These slots are occupied by user bits.

In frame i+2 virtual circuits 2, 9, 6 and 1 occupy the same slots as in frame i+1. The first three free slots in frame i+2 are allotted to virtual circuit 5 for the user bits. (Note, the header for virtual circuit 5 was transmitted in frame i+1).

Figure 3:
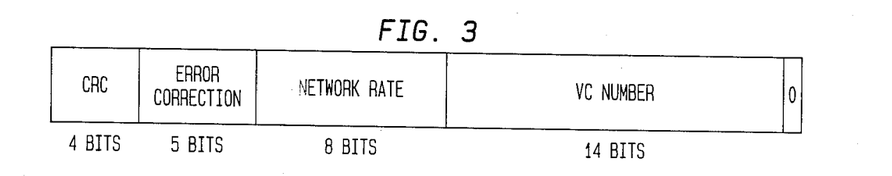
FIG. 3 illustrates a header which precedes the transmission of a voice or data spurt over the virtual circuit of FIG. 1.

FIG. 3 illustrates a 32 bit header. The first bit is a zero to signal the beginning of a header, the next 14 bits are the virtual circuit number, the next 8 bits are devoted to the type of transmission, (e.g., voice, video, data,) and the transmission rate. The next 5 bits are allocated to single error correction and the final four bits are allocated to an error detecting CRC.

3. Synchronous Virtual Circuit Switch

Figure 4:
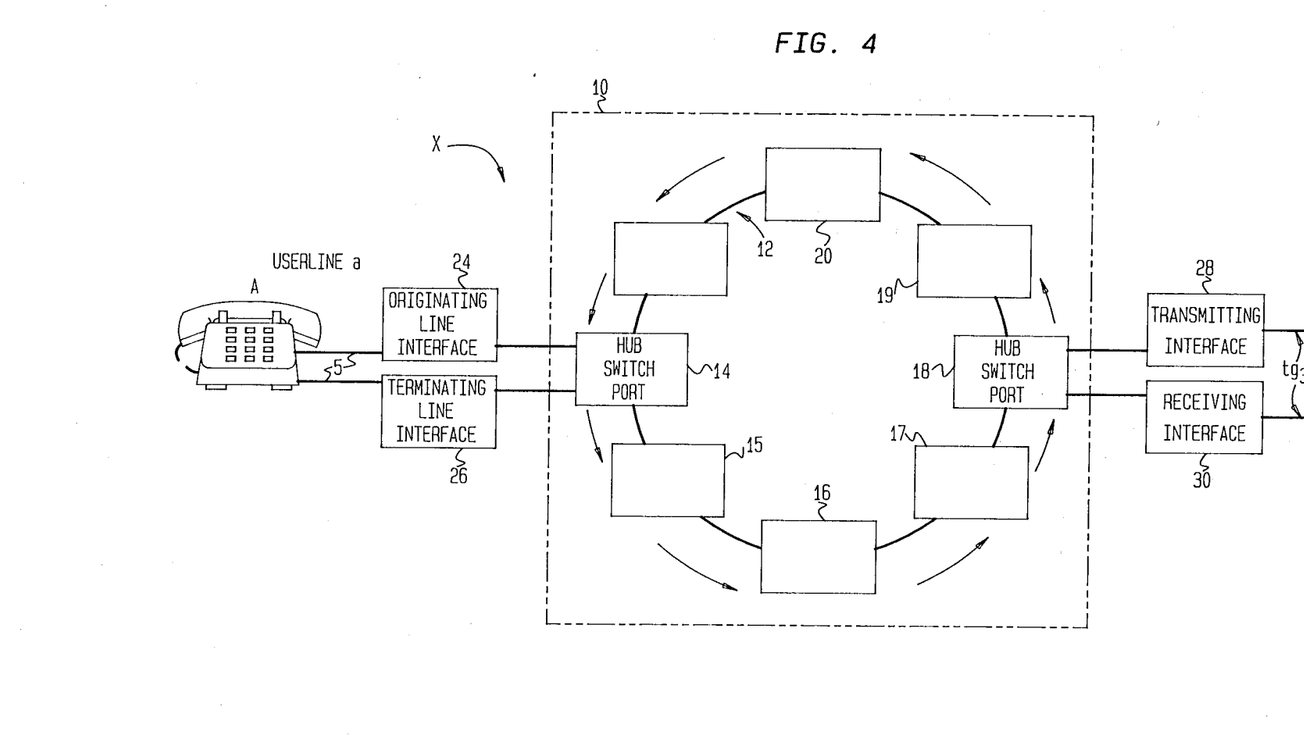
FIG. 4 illustrates a synchronous virtual circuit switch of the type comprising the virtual circuit of FIG. 1, in accordance with an illustrative embodiment of the invention.

The synchronous virtual circuit switch node X which connects the bidirectional subscriber line 5 to the bidirectional trunk group 3 is illustrated in FIG. 4. The switch node X comprises, for example, the burst switch 10 developed by GTE laboratories for the Distributed Burst Switching System (DBSS) described above.

The DBSS switch 10 comprises a high bit rate data bus 12 (e.g. 100 M bits/sec.) which serves to connect a plurality of hub switch ports 14,15,16,17,18,19,20. In FIG. 4 data is transmitted along the bus 12 in the counter clockwise direction. Each of the hub switch ports receives data from a trunk group or subscriber line and puts that data on the bus 12 for further transmission by another trunk group or subscriber line. For example the port 14 receives data from user A over the subscriber line 5 and puts this data on the bus 12. The port 14 also receives data from the bus for transmission over line 5 to user A. Similarly hub switch port 18 receives data from the bus 12 for transmission over trunk group 3 to switch Y. Port 18 also puts data received by way of trunk group 3 onto the bus 12. In this way the switch X serves to interconnect a plurality of trunk groups and subscriber lines so as to permit a wide variety of virtual circuit connections in the network.

The switch X also includes a group of interfaces which provide the switch X with its multiple bit rate capability. Each subscriber line is connected with a port by means of an originating line interface, which serves to transfer data originating at the user station to the port. A terminating line interface serves to transfer data from the port to the user station by way of the subscriber line. Thus, in FIG. 4 subscriber line 5 interfaces with port 14 of switch X by means of originating line interface 24 and terminating line interface 26.

Similarly, a trunk group is connected with a port by way of a transmitting interface which serves to interface outgoing data from the port with the trunk group and a receiving interface which serves to interface incoming data from the trunk group with the port. Thus, trunk group 3 interfaces with port 18 by means of transmitting interface 28, and receiving interface 30. The aforementioned interfaces include the frame maps which enable switch X to determine which virtual circuit particular received slots belong to and to determine how to allocate slots to be transmitted among the various virtual circuits requiring service.

4. Originating Line Interface

To review briefly, in the example of a virtual circuit shown in FIG. 1, customer A who is connected to switch X via line 5, calls customer B who is connected to node Y via line 9. Trunk group 3 connects node X to node Y. Only the path from A to B is discussed here in detail. The reverse path from B to A is substantially similar and is not discussed here in detail.

Illustratively, customer A desires to transmit at 128k bits/sec. which corresponds to two slots per frame. Thus, the virtual circuit from A to B will require 2 slots in each 24 slot 125 microsecond frame transmitted between switch X and switch Y.

Figure 5:
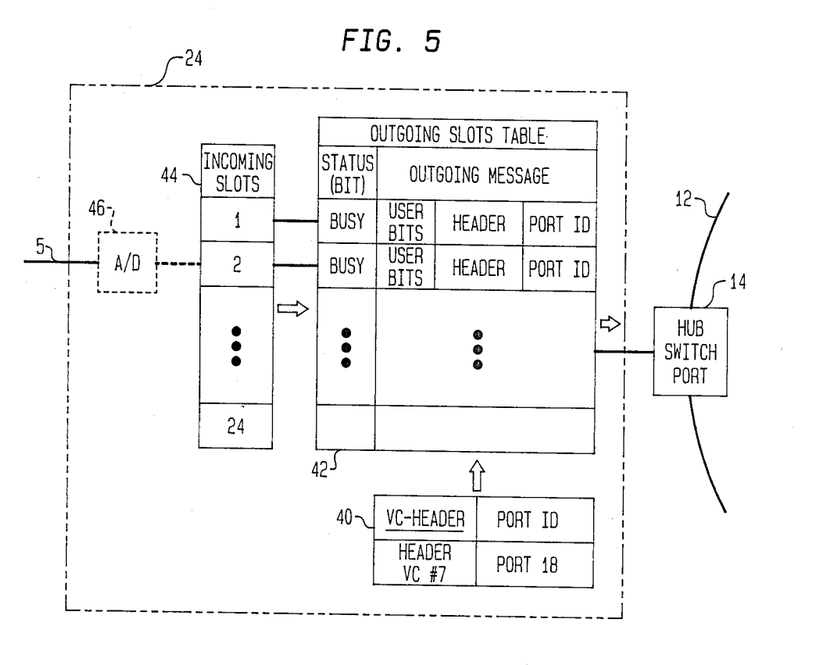
FIG. 5 illustrates data structures maintained in an originating line interface of a switch of the type shown in FIG. 4.

The originating line interface 24 connects subscriber line 5 to port 14 of the switch node X. As shown in FIG. 5, the originating line interface 24 includes three main data structures. These are the VC table 40, the outgoing slots table 42, and the incoming slots table 44. The VC table 40 stores the header and port identification information for the virtual circuit utilizing the originating line interface 24. The outgoing slots table 42 stores and organizes information to be put on the bus 12 through port 14. The outgoing slots table 42 is a buffer memory illustratively comprising 24 shift registers with 48 bits per register. The port 14 reads sequentially the 8 right hand most bits from each register during one 125 microsecond frame period and puts these bits on the bus 12. The incoming slots table 42 buffers data arriving on subscriber line 5. Illustratively, the incoming slots table 40 comprises 24 registers with eight bits per register. Since user A wishes to transmit at 128 kilobits/sec., it will utilize two out of the 24 eight bit registers in the incoming slots table in each 125 microsec. frame period. Note, the maximum transmission rate of user A would involve using all 24 slots in a given frame period.

At call set up time, the VC table 40 gets loaded with the header of the new VC between customer A and customer B, which new VC illustratively has the VC number 7. The port I.D. number in the VC table 40 designates port 18 which is the port associated with trunk group 3. Only one other table entry is needed to set up the virtual circuit between A and B. In the receiving interface 32 (see FIG. 1) which connects trunk group 3 to switch node Y, a table entry is set up which translates the incoming VC number (7) to an outgoing VC number, which in this case is the identification number of the port (not shown) which connects subscriber line 9 to the switch node Y.

As soon as the two updates described above have been accomplished, the virtual circuit between customer A and customer B is established.

When customer A produces a spurt of data, this data will be received in the incoming slots table 44. If the data produced by customer A is analog, the data is digitized by analog to digital converter 46, shown in phantom in FIG. 5.

Data from customer A is received into and moved out of the incoming slots table 44 at the rate of 128 kilobits per second (or 16 bits per 125 microsecond frame period). Thus, two slots are needed in the incoming slots table, for example slots 1 and 2. As soon as data is detected in the incoming slots table 44, two free registers are identified in the outgoing slot table 42, (i.e. one register in the outgoing slots table 42 for each register being used in the incoming slots table 44). Let the first two entries be free in 42. The header for VC #7 and the port ID number from the VC table 40 will be copied into the forty right most bits of the first and second registers of the outgoing slots table 42. The first 8 user bits from the incoming slot table 44 (e.g. from slot #1) are then transferred into the 8 left most bits of the first outgoing slot table register and the second 8 user bits from the incoming slot table 44 (e.g. from slot #2) are transferred into the 8 left most bits of the second outgoing slot table register.

During each subsequent frame period, the right most 8 bits from all 24 entries in the outgoing slot table 42 are put on the bus 12 of the switch X. In this case, however, only the first two entries contain useful information. The remainder of the entries contain synchronization characters. Simultaneously, in each subsequent frame period 8 user bits from the incoming slots table are successively placed in the left most 8 storage locations of the first two registers in the outgoing slot table 42.

After 5 frame periods, the header for virtual circuit #7 connecting customer A and customer B has been transmitted to the transmitting interface 28 associated with the port 18 (see FIGS. 1 and 4) and the transmission of user bits can begin.

As soon as silence is detected on line 5, (i.e. no new data from customer A is received in the incoming slots table), a 32 bit end of spurt flag is inserted into the first two registers in the outgoing slot table 42. After the end of spurt flags are transmitted, the status of the first two registers will change from busy to free. During subsequent frame periods synch characters will be entered into these registers until a new burst is detected.

5. Transmitting Interface

Data from the outgoing slots table 42 of originating line interface 24 is to be routed to trunk group 3, which trunk group forms part of the virtual circuit connecting customer A to customer B. Thus, this data is routed to port 18 of switch X and to the transmitting interface 28 which connects trunk group 3 with the port 18.

Figure 6:
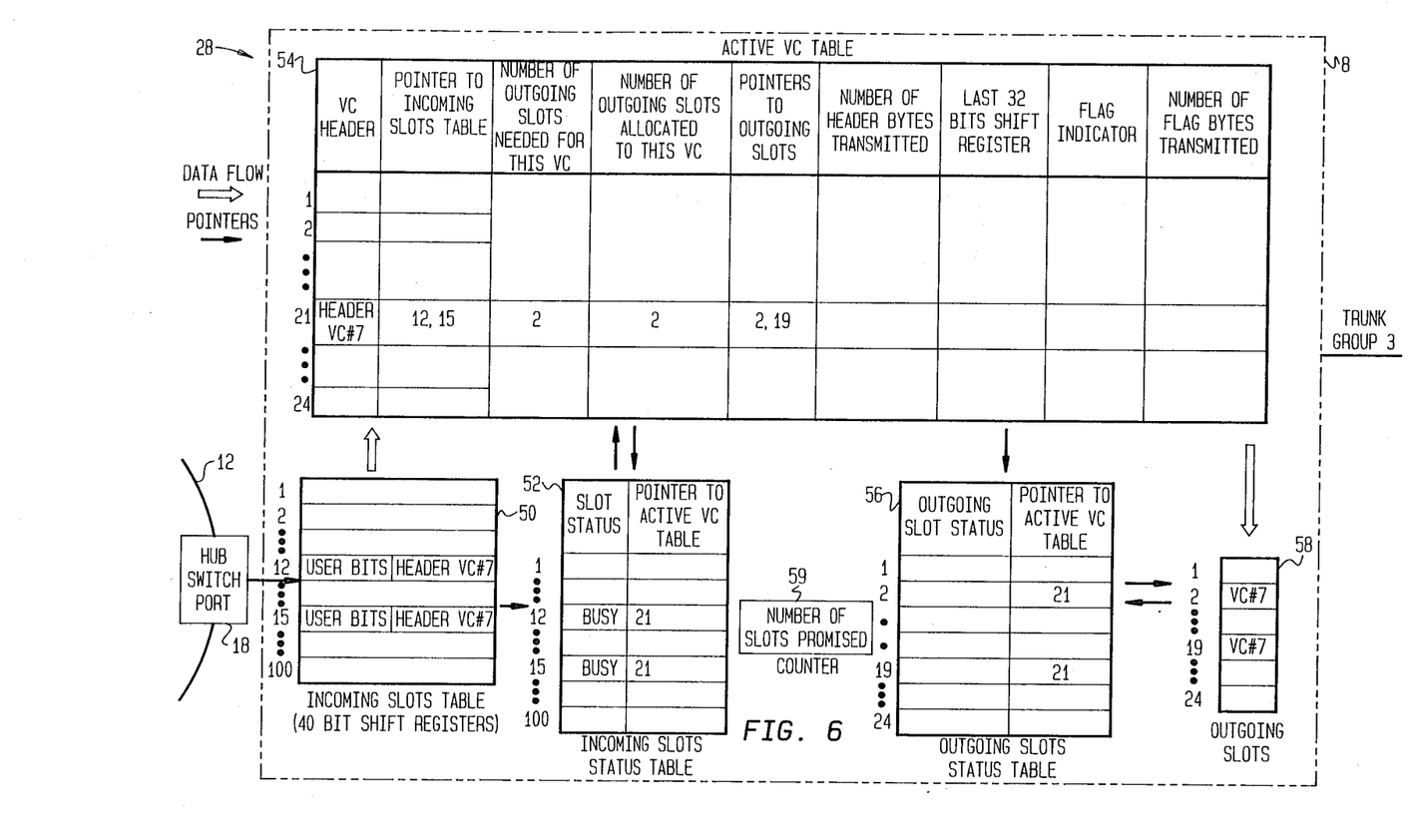
FIG. 6 illustrates data structures maintained in a transmitting interface of a switch of the type shown in FIG. 4.

Data from port 18 enters the transmitting interface 28, depicted in FIG. 6, by means of incoming slots table 50. Illustratively, the incoming slots table 50 comprises a large number (e.g. 100) of 40 bit shift register entries. The rightmost byte of each entry in the incoming slots table 50 is read during each frame period. The incoming slots table 50 needs a large number of slots for the following reason. The port 18 and incoming slots table 50 can receive slots from all other ports in switch X via the high bit rate bus 12. Thus, while the transmitting interface 28 can only transmit 24 slots per 125 microsecond from over trunk group 3, it can receive from other ports in switch X many more than 24 slots in a frame period. It is the job of the interface 28 to decide which 24 of the received slots to transmit over the trunk group 3 in any frame period. The manner in which this decision is made is discussed below.

Every entry in the incoming slots table 50 can be either busy or free. If it is free (this is the initial state) then it contains synch characters. Each synch character starts with 1. When a 0 is detected in the first bit of a register that is free, then the register becomes busy and the first 32 bits are the header of the new burst. While the register is in the busy state, if an end of spurt flag is detected then the register becomes free.

To keep track of the state of each register in the incoming slots table 50, the transmitting interface 28 maintains an incoming slot status table 52 to indicate whether each entry in the incoming slot table 50 is busy or free. The number of entries in the incoming slot status table 52 is equal to the number of entries in the incoming slots table 50. Each entry comprises the following fields:

Slot status (1 bit, 1=busy; 0=free)
Pointer to the active VC table 54 (5 bits).

The "active VC table" 54 contains 24 entries and stores information about currently active virtual circuits using the transmitting interface 28. Each entry contains the following fields:

VC header (32 bits)
Pointers to the incoming slot table 52 which identifies the incoming slots allocated to this VC. The ith bit is 1 if and only if the ith incoming slot is allocated to this VC.
Number of outgoing slots needed for this VC
Number of outgoing slots allocated to this VC.
Pointers to the allocated outgoing slots.
The ith bit is 1 if and only if the ith outgoing slot is allocated to this VC.
Number of header bytes transmitted.
Last 32 bits shift register.
Flag received indicator (0 if no flag has been received, 1 otherwise).
Number of flag bytes transmitted.

During each frame cycle (125 us), the entries in the incoming slots table 50 are sequentially read. For each incoming slot do the following:

---

If slot i was, and remains free, no action is taken.
If slot i was free and a new header is detected then:
{   The status of the slot in the incoming slot
   status table 52 is changed from free to busy.
   The active VC table 54 is scanned for an
   entry with the same VC header. If none found
   then:
   {   Select the first free entry (entry k) in
      the active VC table
         Active VC table (k). VC header = right-
         most 32 bits in slot i
         Active VC table (k). Number of outgoing
      slots needed = 1
      Active VC table (k). Pointers to incoming
      slot table (i)=1
      Incoming slot status table(i). Pointers
      to active VC table = k
   }
Else, if a matching VC header is found in entry k in the
active VC table then:
{   Active VC table (k). Number of outgoing slots needed ++
   Active VC table (k). Pointers to incoming slots
   table(i)=1.
   Incoming slots status table(i). Pointers to
   active VC table = k
}}
If slot i is busy then check for end of spurt flag in
slot(i).
If an end of spurt flag is found then:
{   Active VC table (incoming slot status table(i).
   Pointer to active VC table). Flag received
   indicator = 1
   Incoming slot status table(i). Slot status = 0
}

---

After reading each incoming slot, the aforedescribed operations provide a list of active VC's including their headers, the number of outgoing slots each one needs, and a bi-directional map between this list and the incoming slots table.

After reading the incoming slots, the transmitting interface must decide which outgoing slots to allocate to which VC. For this purpose the transmitting interface uses the active VC table 54 described above, as well as an outgoing slots status table 56. The outgoing slots status table maps the status of each of the 24 outgoing slots 58 transmitted over trunk group 3 in each frame. Each entry in the outgoing slots status table 56 contains the following fields, 1. Slot status—Illustratively 3 bits are used to indicate one of the following status condition for each of the twenty four outgoing slots
   contains user information
   contains a byte of header
   contains a byte of flag
   free
   empty (this ephemeral state occurs if a VC which occupies e.g. 10 slots has finished transmission in the beginning of a frame, resulting in e.g. one slot of user information and four slots for a flag. The remaining 5 slots are empty. They contain no information and cannot be reallocated during this frame. Their status changes to free as soon as the current frame terminates.

2. Pointer to the active VC table. If the slot is free, then this pointer is null, otherwise it points to the proper entry of the active VC table 54.

Through use of the foregoing data structures, the transmitting interface 28 knows how many free slots are available in the frame which it assembles currently and the requirements of the VCs that are waiting to be served. The transmitting interface 28 can use any of a variety of disciplines to do the allocation. Some of those disciplines are: first come first serve; different priorities chosen among voice, video, interactive data, bulk data; allocations that optimize the utilization of the transmission resources by favoring a combination of VCs that best matches the number of free slots; any combination of the above or other strategies. Furthermore, during congestion, some bursts may be recoded into lower bit rates. This information is entered into the "network rate" field in the VC's headers. The transmitting interface may also store some bit streams (e.g. bulk data) for delayed transmission.

The operation of the transmitting interface 28 may be further understood by returning to the example of the virtual circuit between customer A and customer B. Initially, assume that entries 12 and 15 are free in the Incoming Slots Table 50. Other entries may be either free or busy. Soon after the Originating Line Interface 24 (See FIG. 5) starts transmitting the contents of its Outgoing Slots Table 42, identical VC headers will appear in entries 12 and 15 in the Incoming Slots Table 50 of the Transmitting Interface 28 (of FIG. 6), followed by user bits being transmitted from A to B. The transmitting interface 28 is alerted to this change by the presence of the 0's in the right-most positions in entry 12 and in entry 15 in the Incoming Slots Table 50.

The active VC table 54 is updated using the above described algorithm as follows: When a header is detected in entry 12 of the incoming slots table 50, the active VC table 54 is scanned from top to bottom for a matching header. In this case, no matching header is found. Let 21 be the first free entry in the Active VC Table 54. The VC header from entry 12 in the Incoming Slots Table is copied into entry 21 in the Active VC Table 54. The "number of outgoing slots needed" field of entry 21 in the Active VC Table is incremented from zero to one and the "pointer to the Incoming Slots Table" is updated from all nulls to 12. At this point all other fields in this entry of the Active VC table are null.

Next the transmitting interface 28 updates the Incoming Slots Status Table 52. The "slot status" in entry 12 is changed from free to busy and the value of the "pointer to Active VC Table" is changed from null to 21.

When entry 15 in the Incoming Slots Table 50 is scanned, the transmitting interface 28 is alerted to its change of status from free to busy. The Active VC Table 54 is scanned for either a free entry or a matching VC header, and a match is found in entry 21. The "pointers to the Incoming Slots Table" field in entry 21 of the Active VC Table 54 is updated so that it also points to slot 15. The "number of slots needed" field is incremented from one to two. Entry 15 in the Incoming Slot Status Table 52 is updated by changing the "slot status" field from free to busy and changing the "pointer to Active VC Table" from null to 21.

After the VC headers from entries 12 and 15 in the Incoming Slots Table have been processed, the header and the succeeding user bits are moved through the "last 32 bits" shift register in entry 21 of the Active VC Table. Every time this register gets updated a check will be made for the presence of an end of spurt flag. As soon as a flag has been identified, the "flag indicator" in entry 21 of the Active VC Table is changed from zero to one; and during each of the following 2 frames, as the flag is being transmitted, the "number of flag bytes transmitted" field in entry 21 in the Active VC Table will be incremented by 2. When the value in this field reaches 4, entry 21 in the Active VC Table 54 will be cleared, along with entries 12 and 15 of the Incoming Slots Status Table 52. The transmitting interface 28 will then start checking for the arrival of new VC headers in entries 12 and 15 of the Incoming Slots Table 50.

As discussed above, almost independently of the "read" operation described above, the transmitting interface performs a "transmit" operation in which outgoing slots are allocated. For the transmit operation, the Active VC Table 54 and the Outgoing Slots Status Table 56 are used.

At the end of the frame period during which the VC headers from entries 12 and 15 in the Incoming Slots Table were used to update entry 21 in the active VC table, the Outgoing Slots Status Table 56 is scanned for entries that are either "free" or "empty". Illustratively, it is found that entry 19 is "free" and entry 2 is "empty", all other slots being busy with user bits from other virtual circuits. Assume that no other VC headers are currently awaiting transmission. The transmitting interface 28 will then transmit over trunk group 3 the first byte of the header on the free slot 19 in the current frame ("empty" slot #2 cannot be used until the next frame). Entry 19 in the Outgoing Slots Status Table 56 is updated to indicate that it is transmitting a header and point to entry 21 in the Active VC Table. At the same time, the "number of header byte transmitted" field in entry 21 of the Active VC Table will be incremented from 0 to 1.

The transmitting interface 28 also maintains a number of slots promised counter 59. This counter shows the number of slots needed for all the virtual circuits whose headers are currently being transmitted. Assume the value of this counter was zero initially; it will now be changed from zero to two as the virtual circuit connecting customer A to customer B requires two slots per frame. (The number of slots required by each Active VC is stored in the Active VC Table 54). Thus the transmitting interface 28 knows that if a new VC header were to appear in the Active VC Table, it would not use any of the currently available slots (2 and 19) since these will be needed for VC #7 between customer A and customer B. Thus the new VC could not be served until additional slot(s) are free.

In the next frame period both slots 2 and 19 are used to transmit the 2nd and 3rd bytes respectively of the header. Entry 2 in the Outgoing Slots Status Table 56 will be updated to indicate that it carries header information and it will point to entry 21 in the Active VC Table 54. The "number of header bytes transmitted" field in entry 21 of the Active VC Table 54 will be incremented from 1 to 3. In the next frame period, the last VC header byte will be transmitted on slot 2. Entry 19 in the Outgoing Slots Status Table will be updated to indicate the slot is free, and the "pointer to the Active VC Table" will be null.

The "number of header bytes transmitted" in entry 21 in the Active VC Table will be incremented from 3 to 4. At the end of this frame period entry 2 in the Outgoing Slots Status Table 56 will be updated to indicate that slot 2 is now free and the "pointer to the Active VC Table" will be null.

During the succeeding frame period the transmission of user bits will start, using slots 2 and 19, which are the only free outgoing slots. Entries 2 and 19 in the Outgoing Slots Status Table 56 will be updated. Their "slot status" fields will change from "free" to "contains user bits" and their "pointer to Active VC Table" will indicate 21. Meanwhile, in entry 21 in the Active VC table the "number of outgoing slots allocated" will change from 0 to 2 and the "pointers to allocated slots" will indicate 2 and 19. The Counter of Number of Slots Promised will be changed from 2 to zero.

Subsequent frames will carry user bits in slots 2 and 19 from the VC from A to B, until the spurt terminates with an end of spurt flag. As soon as the latter is detected in the "last 32 bits" shift register in entry 21 of the Active VC Table the "flag indicator" in the same entry will change from 0 to 1. Illustratively the first flag byte may be transmitted in slot 19, while slot 2 in the same frame contains the last byte of user bits from the current spurt. In this case the "number of flag bytes transmitted" in entry 21 of the Active VC Table will be changed from 0 to 1 and in entry 19 of the Outgoing Slots Status Table the status indicator will change from "contains user information" to "contains a flag". During the next frame period two more flag bytes will be transmitted in slots 2 and 19. The "number of flag bytes transmitted" field in entry 21 of the Active VC Table will change from 1 to 3 and the status indicator field in entry 2 of the Outgoing Slots Status Table will change from "contains user information" to "contains a flag". In the succeeding frame period the last byte of the flag will be transmitted in slot 2. Slot 19 will contain all 1's or a synch character starting with 1. The "number of flag bytes transmitted field" in entry 21 of the Active VC Table will change from 3 to 4. The "status indicator" of entry 19 of the Outgoing Slots Status Table will change from "contains a flag" to "empty". At the end of this frame period both entries 2 and 19 in the Outgoing Slots Status Table will be cleared, indicating that they are free.

Entry 21 in the Active VC table will also be cleared. This completes the discussion of activities at node X.

6. Receiving Interface

Figure 7:
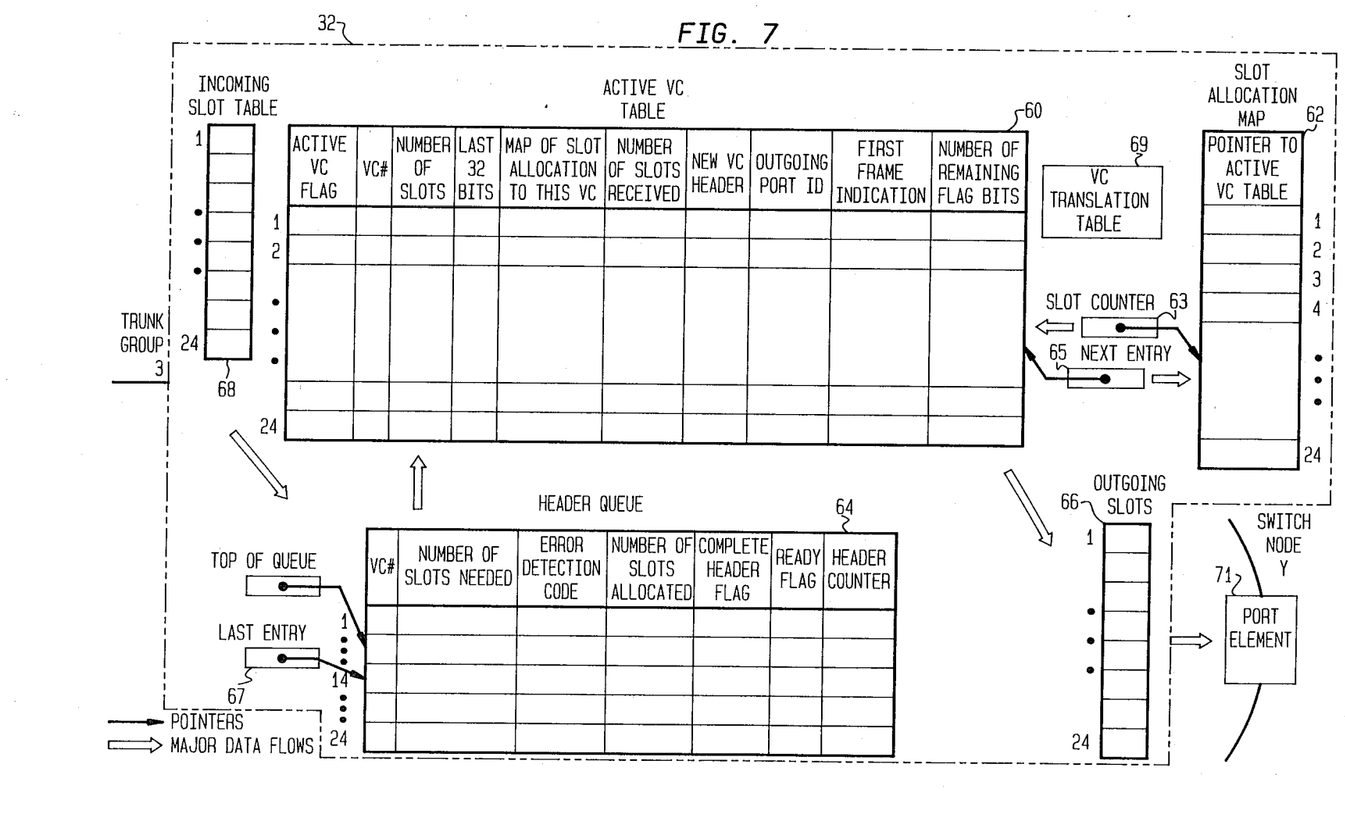
FIG. 7 illustrates data structures maintained in a receiving interface of a switch of the type shown in FIG. 4.

Data which is transmitted out of switch node X over trunk group 3, is received at receiving interface 32 of switch node Y. Data structures comprising the receiving interface 32 are shown in FIG. 7. The receiving interface 32 is connected to a port element in switch node Y.

The receiving interface 32 receives the slots in an incoming slots table 68. A port element 71 in switch node Y reads one byte from each entry in an outgoing slots table 66. The receiving interface 32 performs virtual circuit number translation. The receiving interface also insures that the correct header is placed at the front of each entry allocated to a particular virtual circuit in the outgoing slots table so that bytes comprising the entry are correctly routed by the switch node Y.

To allow correct interpretation of the slots in each frame and to perform the above-mentioned functions, the following data structures are maintained in the receiving interface 32.

1. The Active VC Table 60 contains the following fields for each VC which "owns" slots in the current frame:
   active VC flag
   VC number
   number of slots
   the last 32 bits received on this VC (32 bits shift register)
   a map of the slots allocated to this VC (24 bits, a 1 for a slot allocated to this VC, a 0 otherwise)
   number of slots received (counts the number of user bytes received, up to 4, then it remains at 4 for the duration of the spurt)
   new VC header (32 bits)
   outgoing port identification
   first frame indication. (1 after header has been received, 2 during arrival of first frame with user information, 0 otherwise)
   number of remaining flag bits (ranges from 32 when no flag bits have been received to 0 when all 32 flag bits have been received)

This table has at most 24 VC entries. (The number of active VCs cannot exceed the number of slots per frame.)

2. The Slot Allocation Map 62 contains one pointer for each time slot. If the time slot has been allocated, (i.e., the slot contains user information, a flag, or synch characters for an "empty" slot) the pointer indicates the corresponding entry in the Active VCs table. If the slot is free or contains header information the pointer is null.

3. The Header Queue 64 has several fields for each VC which did not yet receive its full set of slots: These fields are
   VC number
   number of slots needed
   number of slots allocated
   complete header flag
   ready flag (which denotes that the last byte of the header was received in the previous frame)
   error detection code
   Header Counter Field (which indicates the number of header bytes still to be received for a given VC from a maximum of four to a minimum of zero)

The Header Queue has at most 24 entries.

4. Outgoing Slot Table 66 is a buffer for outgoing headers, trunk group identifiers, and user bits that are ready to be switched. Illustratively, it contains 24 shift registers of 48 bits each (to accommodate the port I.D. number—8 bits, header—32 bits, and at least one user byte—8 bits). One byte is read from each shift register comprising the outgoing slots table 66 during each frame period.

In addition to these tables the receiving interface 32 also contains a Slot Counter 63 which indicates the current slot. The counter 63 comprises 24 bits. Illustratively, all the bits up to the current slot are 1, the rest 0. The receiving interface 32 also includes 8 bit "incoming slot" registers 68 for the slots received from the incoming trunk group 3, a pointer to the last (unfinished) entry in the Header Queue 64, a top of queue pointer to the oldest entry in the Header Queue 64, and a pointer to the next entry in the Active VC table 60.

In order to expedite the processing of an arriving time slot, several operations are attempted concurrently as each time slot is received (though only one would be realized). The operations are as follows.

If the pointer in the Active VC Table to the Slot Allocation Map 62 is null, and the Header Queue 64 has an active entry (with "complete header flag"=1) then change the pointer in the Slot Allocation Map to point to a free entry in the Active VC table, as indicated by the "next entry" pointer 65. At the same time, update the "map of allocated slots" and "last 32 bits received" (with the content of the current slot) in the Active VC table. If the "number of slots allocated" in the Header Queue 64 is 0 then use the information in the Header Queue 64 to fill in the "VC number" and "number of slots" in the Active VC table and set the "number of remaining flag bits" in the Active VC table to 32. Update the "number of slots allocated" in the Header Queue 64. If this number is equal to the "number of slots needed" then eliminate the whole entry from the Header Queue, set the "active VC flag" to 1, and change the value of the next entry pointer into the Active VC table.

Send the content of the slot to the table entry indicated by the Slots Allocation Map. If the slot has been allocated to a VC and the corresponding "active VC flag" in the Active VC table is 1 then the corresponding field for "last 32 bit" will be updated.

If the "active VC flag" in the Active VC table is 0, then change the pointer of the current slot in the Slot Allocation Map to null. (As we shall see shortly, this means that an end-of-spurt flag has been received for this VC, and therefore the current slot is in the "empty" state; changing the value of the pointer to null changes the state of the slot from "empty" to "free"). The content of the slot would be checked to be sure it is a valid synch character.

If the slot contains the first byte of a header (the pointer in the Slot Allocation Map 62 is null, the Header Counter is 4 and the first bit in the slot is 0) then the slot's content will be routed to the Header Queue 64, according to the Last Entry pointer, the Header Counter will become 3 and the "complete header flag" in the Header Queue is set to 0.

If the slot contains header information (the pointer in the Slot Allocation Map is null and the Header Counter is 1, 2 or 3) its content will be sent to the Header Queue using the "Last Entry" pointer. The value of the Header counter will be decremented by 1. If it reaches 0 then its value becomes 4, the header is decoded, the "complete header flag" is set to 1, and the Last Entry pointer is updated to the next entry in the Header Queue.

Preferably, the tests for the above actions are performed in parallel. All but one of these actions will be blocked. This enables the slots in the current frame to be read with maximal speed so that the receiving interface knows how to interpret the succeeding frame before the succeeding frame has come and gone.

The Active VC Table 60 contains the last 32 bits of each active VC. Whenever, for example, 15 consecutive 1's are detected in this shift register, an end-of-spurt flag is recognized and the deallocation procedure starts:

the active VC flag is set to 0.

the current slot (during which the last flag bit arrived) as well as all previous slots in the frame which have been allocated to this VC are deallocated. The deallocation comprises setting the pointers of the corresponding slots, in the Slot Allocation Map to null. The correct entries in the Slot Allocation Map are determined by taking the logical product (AND) of the "map of slots allocated to this VC" in the Active VC table and the Slot Counter and using the result as a mask for routing the null pointer value to all the entries in the Slot Allocation Map 62. The remaining slots which have been previously allocated to this VC will be deallocated (the corresponding pointers in the Slot Allocation Map will be set to null) as they arrive and the "active VC flag" in the corresponding entry in the Active VC table is found to be 0.

The use of the above-described data structures in the receiving interface 32 and the rules for allocating and deallocating slots to and from particular virtual circuits in the receiving interface may be more clearly understood by returning to the example of the virtual circuit connecting customer A to customer B. In this regard, recall that the transmitting interface 28 in switch node X allocated slots 2 and 19 to virtual circuit #7 which connects customer A to customer B.

Consider the first frame that arrives at switch Y from switch X with a portion of the header for the virtual circuit from customer A to customer B. Before the start of this frame period, the Slot Allocation Map 62 shows that slot 2 is empty, slot 19 is free and all the other slots contain user bits belonging to other virtual circuits. When the Receiving Interface reads incoming slot 19, as indicated by the Slot Counter, it notices a 0 in the rightmost position, indicating that the previously free slot now contains the first byte of a VC header. Suppose that the Last Entry pointer 67 currently indicates entry 14 in the Header Queue 64. The "header counter" field in entry 14 of the Header Queue 64 will be changed from 4 to 3, indicating that only 3 more bytes are needed to complete the header. The "Complete Header" field in the same entry will be set to 0 indicating that the header is not yet complete. Similarly, the "ready flag" in the same Header Queue entry will be set to 0 indicating that the VC is not yet ready to receive slots containing user bits.

In the next frame period, slot 2 and slot 19 contain the second and third bytes of header information, respectively. Slot 2 in the succeeding frame contains the fourth byte of the header information. The VC number (i.e. VC #7) bit rate information, and error correction information are copied from these slots into the appropriate fields of line 14 in the Header Queue 64.

At this point, an error detection routine is called in, and finds no errors in the VC number and bit rate. (Note that the "number of slots needed" field in entry 14 of the Header Queue 64 actually contains the bit rate (128k bps) of the VC. A fast decoder may be used to translate the bit rate into the number of slots needed (2)) The "header counter" field in entry 14 in the Headers Queue will be decreased to 0 and the "complete header" flag in the same entry will be changed from 0 to 1 indicating that the header is complete. Assume that the Next Entry pointer 65 indicates entry 18 in the Active VC Table. The "number of slots" field in entry 14 of the Headers Queue (i.e. 2) will then be copied into the "number of slots" field in entry 18 of the Active VC Table. Similarly, the "VC number", 7 will be copied from entry 14 in the Header Queue into entry 18 in the Active VC Table. Using the VC number (7), entry 7 in the VC Translation Table 69 will be accessed to retrieve the outgoing port identification number (i.e. the identification number for the port which connects subscriber line 9 to switch node Y) for this VC and the outgoing VC number, (in this case, the outgoing VC number identifies subscriber line 9 which is connected to customer B).

At the same time, the new port I.D. and VC number are written into the Active VC table, the new Port I.D. and VC number are written into the left most bytes of entries 2 and 19 in the outgoing slots table 66. User bytes are written into entries 2 and 19 behind the Port I.D. and VC number information so that the user bytes will be properly routed by the switch node Y. In the Active VC table, the new Port I.D. and VC number will be copied into "new VC header" and "outgoing port I.D." fields of entry 18. The "first frame indication" in the same entry is set to 1, indicating that the header has been received in full. The "Active VC" flag in entry 18 of the Active VC Table is set to 1, indicating a current spurt. The last entry pointer into the Header Queue is incremented from 14 to 15, indicating the proper entry from the next VC header that may arrive on trunk group 3. The "header counter" field in entry 15 of the Header Queue is set to 4, indicating that 4 bytes are needed to receive in full the next header.

At the end of this frame period both incoming slots 2 and 19 will be free and the pointers in entries 2 and 19 of the Slot Allocation Map 62 are null. Also, at the end of the current frame cycle the "first frame indication" in entry 18 of the Active VC table is changed from 1 to 2 indicating that the next frame is the first one with user information for VC 7.

It has been assumed in this example that when the first byte of the header for VC #7 arrived, there were no entries in the Header Queue (i.e, all other spurts were actually in progress, carrying user bits) and therefore the Top of Queue pointer was equal to the Last Entry Pointer (=14). Of course, in other situations, this will not be the case.

During the next frame, when incoming slot 2 is read, it is recognized as a slot that was free at the end of the previous cycle. However, the Top of Queue points to entry 14 in the Header Queue, where the "number of slots allocated" field is zero. Furthermore, the corresponding entry in the Active VC Table, that is entry 18, indicates that this VC (number 7) has received its full header and is now receiving its first frame with user bit. Therefore slot 2 is allocated to VC 7. The "map of allocated slots" in entry 18 of the Active VC Table is updated to point at slot 2. The contents of slot 2 are copied into the 8 right-most bits of the "last 32 bits"

field in entry 18 of the Active VC Table and transmitted to entry 2 in the Outgoing Slots table for further transmission into switch node Y. Entry 2 in the Slot Allocation Map will now be 18, pointing to the corresponding entry in the Active VC Table. The "number of slots allocated" field in entry 14 (as indicated by the Top of the Queue pointer) of the Header Queue is incremented from 0 to 1.

When slot 19 is reached, it is again recognized as being allocated to VC 7 and, therefore, entry 19 in the Slot Allocation Map will get the value 18, pointing to the corresponding entry in the Active VC Table. The content of slot 19 will be copied into the 2nd byte from the right of the "last 32 bits" field in entry 18 of the Active VC Table and transmitted to register 19 in the Outgoing Slots table for further transmission through switch node Y. The "map of allocated incoming slots" in entry 18 of the Active VC Table will be updated to point to slot 19, in addition to slot 2. The map of allocated outgoing slots in 18 of the Active VC table will be updated to point to slot 2,19. The "number of slots allocated" in entry 14 (as indicated by the Top of Queue pointer) in the Headers Queue is incremented from 1 to 2.

Now the "number of slots allocated" is equal to the "number of slots needed" in the same entry, therefore this VC has been allocated all the needed slots and entry 14 in the Headers Queue is erased (all zero or null values) while the Top of the Queue pointer is incremented from 14 to 15. The controller searches the Active VC table for a null entry. Let 23 be the next null entry. The Next Entry pointer is updated from 18 to 23 to indicate where the next VC header and related information will be stored.

During the next frame period, the contents of slots 2 and 19 will be transmitted into outgoing slot table entries 2 and 19. They will also be added to the third and fourth byte positions, respectively, of the "last 32 bits" field of entry 18 in the Active VC Table. With each of these operations the "number of slots received" will be incremented from 2 to 3 (when slot 2 is read), then from 3 to 4 (when slot 19 is read). After this counter reaches the value 4 the controller will check for the presence of an end of spurt flag every time the "last 32 bit" field is updated. With every update the new byte will also be transmitted into the switch node Y. This will continue until an end of spurt flag is detected.

Illustratively, just after reading slot 2 in a particular frame, an end of spurt flag is detected. The "active VC flag" in entry 18 (which is indicated by the pointer in entry 2 of the Slot Allocation Map) is set to 0 indicating that the VC is no longer active. Entry 2 in the incoming slot allocation map (as indicated by the Slot Counter) is changed from 18 to null. When slot 19 is reached it contains all ones, or another synch character starting with 1. The pointer in entry 19 (as indicated by the Slot Counter) in the incoming Slot Allocation Map points to entry 18 in the Active VC Table. In this entry the "active VC" flag is 0. Therefore, the pointer in entry 19 of the Incoming Slot Allocation map is changed from 18 to null. Similarly entries 2 and 19 in the Outgoing Slots Map are reset to null. At the end of this frame period, entry 18 of the Active VC Table is cleared.

Terminating Line Interface

Figure 8:
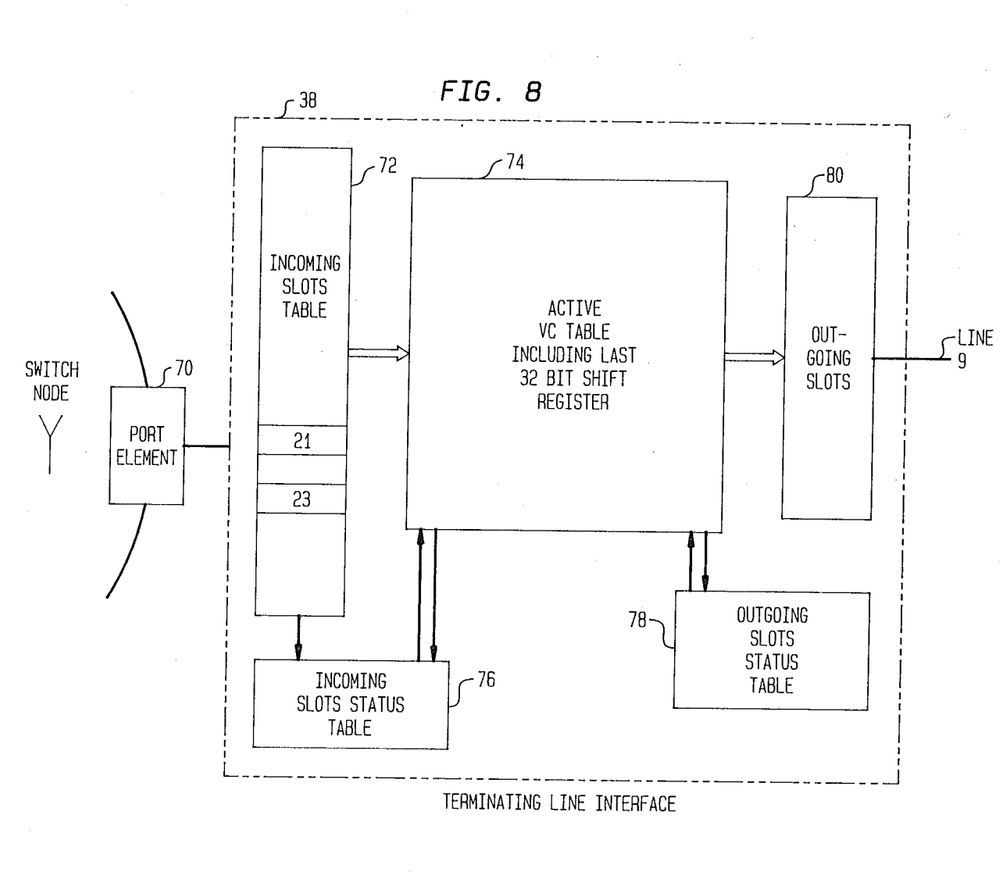
FIG. 8 illustrates data structures maintained in a terminating line interface of a switch of the type shown in FIG. 4.

Turning to FIG. 8, the terminating line interface 38 connects port element 70 of switch node Y with subscriber line 9 (which subscriber line 9 belongs to customer B). The terminating line interface 38 reads its input from the Incoming Slots Table 72 and processes it in the same way as the transmitting interface 28 illustrated in FIG. 6 and described above. Illustratively, the slots allocated to the Virtual Circuit connecting customer A to customer B appear in entries 21 and 23 of the Incoming Slots Table 72.

More particularly, a large number of slots (i.e. larger than 24) may be received in the incoming slots table 72 during each frame period. The Active VC Table 74 along with the incoming slots status table 74 store information about Active Virtual Circuits by reading the incoming slots. Various algorithms such as first come first served are then used to transmit particular slots to the subscriber line. Of course, it is possible that less than 24 slots will be received in the incoming slot table 72 during each frame, in which case the incoming slots may be put on the subscriber line 9. The allocation of outgoing slots 80 is maintained by Outgoing Slot Status Table 78. A small buffer (not shown) can be used to smooth out the delivery of bits to the user.

The terminating line interface 38 will not transmit the initial 32 bits arriving on each register since they correspond to headers, rather than user bits. A 32 bits shift register is maintained in the Active VC Table for each active virtual circuit in the incoming slots table. This shift register will contain the last 32 bits received for each VC. The 32 bits shift registers are used for end-of-spurt flag detection. If no flag has been detected, then the oldest bits are transmitted on the outgoing line. If an end of spurt flag has been detected then a white noise generator generates white noise signals that are transmitted on the outgoing line for voice applications, and nothing, or synch characters for other applications. If the outgoing line is analog then a digital to analog converter (not shown) will be used to convert the incoming slots to analog form.

All subsequent spurts on this VC will be handled in a similar manner. At the end of the call the VC will be dismantled as follows: The end of the last spurt will generate an end of spurt flag that will be processed as described above. In addition, when either A or B notifies the network that the VC is to be terminated (i.e., "hangs up") the following actions will follow:

1. In node X, in the Originating Line Interface, the VC Table 40 is cleared
2. In node Y, in the Receiving Interface 32 entry number 7 in the VC Translation Table will be erased These actions terminate the VC from A to B.

Finally, the above described embodiment of the invention are intended to be illustrative only. Numerous alternative embodiments may be devised by those skilled in the art, without departing from the spirit and scope of the present invention. In particular, the invention was described herein in connection with 125 microsecond frames comprising 24 eight bit slots. However, the principles of the invention are applicable to other frame structures.

What is claimed is:

1. A synchronous virtual circuit communications network capable of supporting multiple bit rate communications between pairs of user stations, said network comprising an array of interconnected switching nodes,
    each of said virtual circuits connecting a pair of user stations passing through one or more switching nodes in said network,
    each of said switching nodes being adapted to synchronously exchange frames of data with neighboring switching nodes, said frames being divided into slots, the slots in each of said frames exchanged between a given pair of said switching nodes being allocated among the virtual circuits passing through said pair of switching nodes, virtual circuits having different bit rates being allocated different numbers of slots in each frame, each of said switching nodes including means for interpreting incoming slots to determine to which virtual circuit each of said incoming slots belong, and means for allocating outgoing slots to virtual circuits requiring such slots and for deallocating slots from virtual circuits no longer requiring slots.

2. A synchronous virtual circuit communications network capable of supporting multiple bit rate communications between pairs of user stations, said network comprising an array of interconnected switching nodes, each of said virtual circuits connecting a pair of user stations passing through one or more switching nodes in said network, each of said switching nodes being adapted to synchronously exchange frames of data with neighboring switching nodes, said frames being divided into slots, the slots in each of said frames exchanged between a given pair of said switching nodes being allocated among the virtual circuits passing through said pair of switching nodes, virtual circuits having different bit rates being allocated different numbers of slots in each frame, each of said switching nodes including means for interpreting incoming slots to determine to which virtual circuit each of said incoming slots belong, and means for allocating outgoing slots to virtual circuits requiring such slots and for deallocating slots from virtual circuits no longer requiring slots, and wherein the transmission on a spurt of user data over one of said virtual circuits is preceded by a header comprising sufficient bits to equal n (n≧1) slots, said header being transmitted by at least one of said switching nodes in the first n available but not necessarily consecutive slots of the next occurring frame or frames containing available slots, no user data belonging to a virtual circuit being transmitted in the slots of the frame or frames in which header slots belonging to that virtual circuit are also transmitted.

3. A switching node for use in a virtual circuit communications network comprising an array of interconnected switching nodes and capable of supporting multiple bit rate communications, said switching node comprising, means for synchronously exchanging frames of data with neighboring switching nodes, said frames being divided into slots, means for allocating slots transmitted to said neighboring switching nodes among a plurality of virtual circuits passing through said switching node, virtual circuits having different bit rates being allocated different numbers of slots in each frame, and means for interpreting incoming slots received from said neighboring switching nodes to determine to which virtual circuit each of said incoming slots belong.

4. A switching node for use in a virtual circuit communications network comprising an array of interconnected switching nodes and capable of supporting multiple bit rate communications, said switching node comprising, a high bit rate data bus arranged in a ring-like configuration, a plurality of port elements located at various positions along said bus for transferring data off of and onto said data bus, interface means associated with at least some of said port elements for transmitting data from said port elements to neighboring switching nodes and for receiving data from said neighboring switching nodes for transmission to said data bus by way of said port elements, said interface means synchronously transmitting to and synchronously receiving from said neighboring switching nodes frames of data, each of said frames comprising slots, said interface means comprising first mapping means for allocating different numbers of slots in each frame to different virtual circuits so that different virtual circuits can have different bit rates, and second mapping means for determining which virtual circuit each of the incoming slots belongs to.

5. A transmission network for enabling communication between pairs of user stations at multiple bit rate transmissions comprising a plurality of switches including means for defining virtual circuits for synchronous transmission of data bursts between adjacent switches in frames comprising time slots and means for allocating different numbers of time slots in said frames to individual ones of said virtual circuits between the same adjacent switches.

6. A transmission network in accordance with claim 5 wherein said allocating means include frame mapping means for tracking which time slots in each frame are being used by which virtual circuit and which time slots are free.

7. A method for synchronous transmission of data bursts between adjacent switching nodes comprising the steps of synchronously exchanging data in frames between adjacent switching nodes, said frames being divided into time slots, allocating a different number of said time slots to different virtual circuits between said switching nodes, and transmitting heading information for a data burst in the first available time slots in a frame, said time slots containing said heading information not necessarily being consecutive and no user data belonging to a virtual circuit being transmitted in the frame or frames in which header time slots belonging to that virtual circuit are also transmitted.

* * * * *